United States Patent [19]
Sendziak

[11] Patent Number: 5,364,677
[45] Date of Patent: Nov. 15, 1994

[54] SELF-ADHESIVE WRAP-ON GRIP FOR SPORTS RACQUETS AND OTHER EQUIPMENT HANDLES

[75] Inventor: Walter Sendziak, Norco, Calif.

[73] Assignee: Gexco Ent. a division of Tennis Ball Saver, Inc., Huntington Beach, Calif.

[21] Appl. No.: 12,906

[22] Filed: Feb. 3, 1993

[51] Int. Cl.$^5$ .............................................. C09J 7/02
[52] U.S. Cl. ................................... 428/40; 428/158; 428/167; 428/172; 428/194; 428/317.3; 428/343; 428/354
[58] Field of Search ............... 428/40, 157, 158, 167, 428/172, 194, 189, 317.3, 343, 354; 156/187, 189

[56] References Cited

U.S. PATENT DOCUMENTS

| | | | |
|---|---|---|---|
| 3,005,742 | 10/1961 | Kennedy | 156/187 |
| 3,607,516 | 9/1971 | Royston | 156/187 |
| 3,740,291 | 6/1973 | Mallard | 156/187 |
| 4,373,718 | 2/1983 | Schmidt | 428/40 |
| 4,544,426 | 10/1985 | Stockman | 156/187 |
| 4,567,091 | 1/1986 | Spector | 428/40 |
| 4,629,648 | 12/1986 | Minick | 428/343 |
| 4,765,856 | 8/1988 | Doubt | 428/40 |
| 4,981,737 | 1/1991 | Rico | 428/40 |

FOREIGN PATENT DOCUMENTS

| | | | |
|---|---|---|---|
| 5213456 | 10/1973 | Japan | 428/40 |
| 2125334 | 3/1984 | United Kingdom | 428/40 |

Primary Examiner—Jenna L. Davis
Attorney, Agent, or Firm—Roy A. Ekstrand

[57] ABSTRACT

A self-adhesive wrap-on handle grip for elongated handles such as those used in various types of implements such as sports racquets, baseball bats, handle bars, and the like includes an elongated preferably resilient material strip having a leading edge and a trailing edge and defining an undersurface and an outer surface. An elongated adhesive strip is formed upon the outer surface of the material strip in a narrow band adjacent the leading edge portion thereof. A peel-off protective strip is removably secured to the adhesive strip to facilitate handling and storage. During the wrapping process, the handle grip is helically wrapped upon the handle portion of a sports racquet such that the trailing edge of each wrapping layer overlies and is aligned with the underlying adhesive strip of the previous layer. In one embodiment, a resilient center bead is supported at or near the center portion of the undersurface of the material strip to form a spiral raised rib within the handle grip when the handle grip is helically wrapped upon the equipment handle.

23 Claims, 1 Drawing Sheet

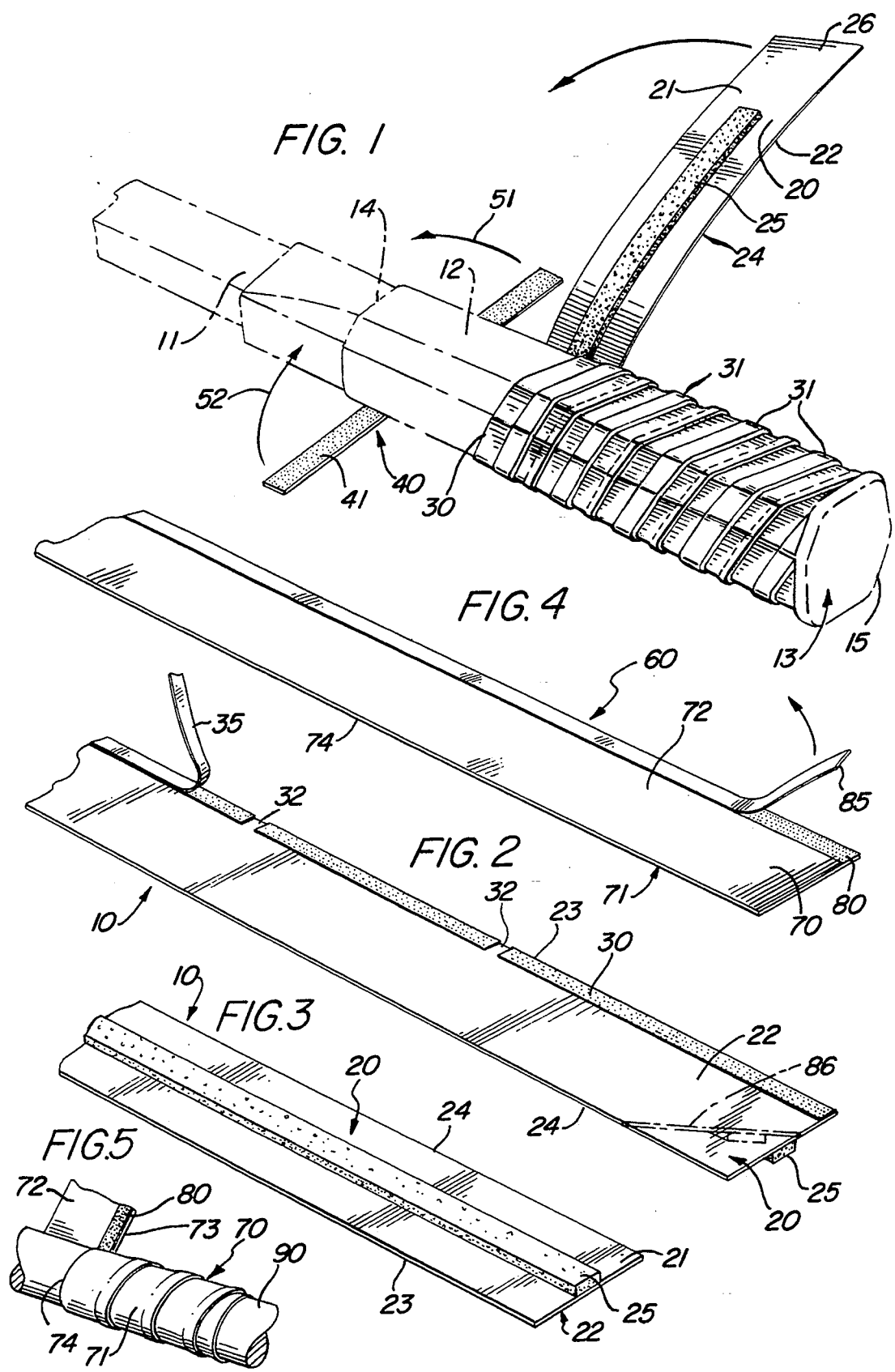

SELF-ADHESIVE WRAP-ON GRIP FOR SPORTS RACQUETS AND OTHER EQUIPMENT HANDLES

FIELD OF THE INVENTION

This invention relates generally to equipment handles and to sports racquets and particularly to the handle grips used thereon.

BACKGROUND OF THE INVENTION

Many sports and game activities utilize a racquet implement in the game play. For example, the structures used for tennis racquets as well as the racquets used in the popular game of racquetball are familiar to most sports enthusiasts. While the structures of such racquets vary substantially, all generally comprise a circular or elliptical frame or the like within which a highly tensioned net or webbing is strung to provide a high energy resilient ball striking surface. The frame further supports an elongated handle which facilitates the user's manipulation of the racquet and which is provided with a gripping area. Most handle grips supplied with the racquet by the manufacturer are formed of a solid material over which materials such as leather, plastic or other synthetic materials are laid. The use of such sports racquets subjects the handle gripping material to substantial wear, stress and perspiration. As a result, the users of such racquets soon discovered the useful life of the racquet could be greatly extended if a protective element was provided to over-wrap the original grip. In addition, early practitioners determined that the quality or certainty of a handle grip itself could be improved by use of materials having a "tacky" characteristic. Early wrap-on over-wrap grip protectors were provided using a woven gauze material having an impregnated gummy or tacky substance within the material. Such wraps were applied in a helical progressive wrap usually starting at the extreme end or butt end of the racquet in a pattern providing several overlapping butt end wraps to secure one end and an upward progression of overlapping spiral or helical wraps terminating at the upper end close to the racquet frame. The tackiness of the impregnated gauze was such that no finishing adhesive strip was required to anchor the final wrap. The objective of such wraps is to improve grip and provide a disposable outer material covering which may readily be discarded and replaced.

While the use of such gauze material wraps improved the player's grip, they frequently created undesired residue upon the user's hands and the underlying original grip material of the racquet handle. In addition, these woven gauze material wraps were found to be abrasive and too rough upon the player's skin. To improve the quality of such wrap-on over-wrap handle grips, practitioners provided improved materials in the form of long narrow strips of softer, smoother, moisture absorbent material with built-in tackiness which did not leave a residue on the hands or the underlying original grip. These new over-wraps were made of plastics or other synthetic materials, leather, or rubber. These materials are over-wrapped upon the original underlying handle grip in a similar manner to the gauze materials. However, due to the absence of adhesive attachment, the over wrapping technique is more carefully undertaken to provide a secure over wrap. To avoid undesired damage to the original underlying handle grip material, the use of adhesives is avoided and the attachment of the over-grip over-wrap depend entirely upon the manner in which the grip is wrapped upon the handle.

These newly developed over-wrap grips were subsequently manufactured in thicker strips to be used to replace the original factory installed basic grip if the racquet user or the original equipment manufacturer so desired.

While the later developed and presently used wrap-on over-wrap handle grips have provided substantial improvement over the earlier woven gauze adhesive based wraps, they have been subject to several problems and limitations. For example, the exposed edges of the wrap material tend to become distorted and curled as the racquet is used. In addition, the ability of the spiral wrap layers to slide upon each other permits the shifting of the handle wrap-on during play and creates an insecure grip feeling for the user. Also, it was difficult to gauge the amount of desirable edge overlap of layers during the process of spirally installing the over-grip, and without an adhesive to hold the over-grip in place during wrapping, it was difficult to hold the wraps in place with respect to each other while installing.

As a result, a continuing need exists in the art for evermore improved wrap-on handle grips for sports racquets and other sports equipment handles which improve the grip quality while extending racquet life without the limitations of the present devices.

SUMMARY OF THE INVENTION

Accordingly, it is a general object of the present invention to provide an improved wrap-on handle grip for sports racquets and other sports equipment handles. Such other sports equipment include, for example but not limited to, baseball bats, squash racquets, badminton racquets, racquetball racquets, handlebars, golf clubs and the like. It is a more particular object of the present invention to provide an improved wrap-on over-grip or basic replacement grip which more securely attaches to the substructure over which it is wrapped and which is resistant to edge curling and shifting tendencies of the wrap-on material during use.

In accordance with the present invention, there is provided for use in combination with an implement having an elongated handle, a wrap-on grip comprises: an elongated material strip defining first and second surfaces, a leading edge and a trailing edge; and an elongated adhesive strip substantially more narrow than the material strip supported upon the first surface adjacent the leading edge, the handle grip being wrappable upon a handle in a helical wrap such that the second surface defines an undersurface against the handle and the first surface defines an outer surface and such that the adhesive strip secures the trailing edge.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of the wrapping operation of a self-adhesive wrap-on handle grip constructed in accordance with the present invention;

FIG. 2 sets forth a perspective view of a portion of the present invention wrap-on handle grip;

FIG. 3 sets forth a perspective view of the wrap-on handle grip of FIG. 2 inverted to reveal the underside thereof;

FIG. 4 sets forth a perspective view of an alternate embodiment of the present invention wrap-on handle grip; and FIG. 5 sets forth a perspective view of the embodiment of FIG. 4 wrapped in an alternative configuration.

DESCRIPTION OF THE PREFERRED EMBODIMENTS

FIG. 1 sets forth a perspective view of a conventional sports racquet 11 shown in dashed line representation having a handle grip generally referenced by numeral 10 being wrapped in accordance with the present invention. Racquet 11 in accordance with conventional fabrication techniques includes a handle grip 12 fabricated and secured to racquet 11 and defining an upper end 14. Racquet 11 also includes an end plate 15 forming the butt end 13 of racquet 11.

In accordance with the present invention, handle grip 10 is shown being wrapped upon original handle grip 12 in accordance with the spiral wrapping operation. Thus, handle grip 10 includes an elongated material strip 20 formed of a somewhat resilient gripping material such as leather, plastic or other synthetic material which provides suitable gripping texture and perspiration absorption characteristics. Material strip 20 defines an undersurface 21 and an outer surface 22 as well as a leading edge 23 and a trailing edge 24. In accordance with the preferred embodiment of the present invention, a resilient generally rectangular cross-sectioned center bead 25 is secured to the center portion of undersurface 21 and is generally coextensive with material strip 20. Center bead 25 may be fabricated to be slightly shorter than material strip 20 at the end portions thereof to facilitate the wrapping process as shown in FIG. 1. In further accordance with the present invention, handle grip 10 further includes an elongated narrow adhesive material strip 30 formed adjacent leading edge 23 upon outer surface 22 of material strip 20. In its preferred form, adhesive strip 30 is generally coextensive with material strip 20. However, once again, to facilitate certain wrapping operations, adhesive strip 30 may, if desired, be slightly shorter at the end portions of material strip 20.

In accordance with the present invention, handle grip 10 is secured to original handle grip 12 in a spiral wrapping operation similar to that carried forward in the attachment of the above-described prior art handle wraps. Thus, handle grip 10 is initially wrapped from end plate 15 by positioning undersurface 21 against original handle 12 such that center bead 25 and undersurface 21 are brought into contact with original handle grip 12. The material strip (such as strip 20) may be trimmed as shown by dashed line representation in FIG. 2 to provide an angled starting edge 86 which becomes generally parallel to end plate 15, and as the first wrap is spiraled onto the handle the second wrap secures the first into position at the bottom of the handle. Once the bottom end is secured adjacent end plate 15, the spiral wrapping process is undertaken in which successive layers of handle grip 10 are helically wound upon original handle grip 12 in the manner shown in FIG. 1. In further accordance with the present invention, each leading edge portion of handle grip 10 exposes adhesive strip 30 upon outer surface 22. Care is taken during the wrapping process to carefully align trailing edge 24 and adhesive strip 30 such that trailing edge 24 is generally aligned with or extends slightly beyond adhesive strip 30 upon the underlying portion of outer surface 22 on the previous wrap layer. Thus, as each spiral is wrapped upon original handle grip 12, trailing edge 24 thereof is adhesively secured by adhesive strip 30 to the portion of outer surface 22 along the line of overlap. As a result, trailing edge 24 is maintained in a secure attachment which precludes the above-described problem of edge curling encountered in non-adhesive prior art devices. The spiral wrapping process continues until handle grip 10 has generally covered the entire surface of original handle grip 12. At this point, the upper end 26 of material strip 20 is secured in place by a top strip 40. Top strip 40 is preferably formed of a conventional adhesive tape material having an adhesive coating 41 on the interior side thereof. Once handle grip 10 has been securely spiral wrapped in the manner described, end portion 26 is secured as top strip 40 is wrapped about upper end 14 of handle grip 12 in the manner indicated by arrows 51 and 52.

As will be apparent from examination of FIG. 1, the provision of center bead 25 upon undersurface 21 of material strip 20 produces a plurality of spiral raised rib portions 31 for handle grip 10. These raised ribs provide improved gripping action and substantially improve the user's manipulation of racquet 11. The cooperation of adhesive strip 30 and material strip 20 within handle grip 10 not only avoids the undesired edge curling which prior art handle grips are subject to but also tends to maintain a secure attachment between respective layers of the handle grip and thus reduces or minimizes the undesired tendency of grip layers to shift during use. As a result, the perception of grip imparted to the user is substantially more secure than that provided by prior art devices.

The material selected for center bead 25 may be varied somewhat in accordance with the design choice of fabricators. However, it has been found advantageous to utilize a center bead material formed of a foam plastic or the like to provide a resilient rib for raised ribs 31. It will be recognized, however, that different materials may be used for both material strip 20 and center bead 25 to provide the desired handle characteristics.

FIG. 2 sets forth a top perspective view of a portion of handle grip 10 prior to assembly to racquet 11 in the manner shown in FIG. 1. As described above, handle grip 10 includes an elongated generally rectangular material strip 20 defining an outer surface 22 and an undersurface 21. Material strip 20 further defines a leading edge 23 and a generally parallel trailing edge 24. In further accordance with the embodiment of the present invention set forth above in FIG. 1, handle grip 10 includes a generally rectangular cross section center bead 25 secured to the center portion of undersurface 21 of material strip 20. This attachment may be carried forward using conventional fabrication techniques such as adhesive bonding or the like. In accordance with an important aspect of the present invention, an elongated adhesive strip 30 is formed upon a portion of outer surface 22 adjacent leading edge 23. The width of adhesive strip 30 is, to some extent, variable in accordance with the characteristics of material strip 20. It has been found in its preferred form to fabricate strip 30 of a double-sided tape and to maintain adhesive strip 30 in a relatively narrow portion of outer surface 22. Adhesive strip 30 may, however, be formed of a deposited adhesive. To facilitate the convenient handling and storage of handle grip 10, a protective peel-off strip 35 is secured to adhesive strip 30 in an overlying relationship and is removed prior to or during the above-described wrapping process. Protective peel-off strip 35 may be fabricated using a thin plastic or plastic impregnated paper material in accordance with general peel-off adhesive techniques. In addition, strip 30 may be interrupted by interruptions 32 to accommodate extension of strip 20.

FIG. 3 sets forth a perspective of a portion of handle grip 10 reversed from that shown in FIG. 2. Thus, as described above, handle grip 10 includes a material strip 20 having a leading edge 23, a trailing edge 24, an undersurface 21 and an outer surface 22. Handle grip 20 further includes the above-described center bead 25 supported upon the center portion of undersurface 21.

It will be apparent to those skilled in the art upon examination of FIGS. 1, 2 and 3 that in accordance with an important aspect of the present invention, adhesive attachment between successive layers of handle grip 10 is provided by the present invention structure without the undesired adhesive attachment to original handle grip 12. Thus, the handle grip of the present invention is secure without raising the potential for damage or undesired adhesive deposit upon the original handle grip. It will also be apparent to those skilled in the art that the present invention handle grip may be wrapped without undue difficulty by practitioners accustomed to the above-described prior art handle wraps and thus may be easily accommodated. Once the present invention handle grip has been used successfully and is to be replaced, it is removed in the same manner as prior art handle grips by initially removing top strip 40 and thereafter simply unwinding the handle grip.

FIG. 4 sets forth a perspective view of an alternate embodiment of the present invention handle grip generally referenced by numeral 60. Handle grip 60 generally corresponds to handle grip 10 with the exception of its elimination of center bead 25. Thus, handle grip 60 includes an elongated material strip 70 generally corresponding to material strip 20 in the embodiment set forth above. Thus, material strip 70 defines an undersurface 71 and an outer surface 72 together with a leading edge 73 and a trailing edge 74. In further accordance with the above-described embodiment of the present invention, an adhesive strip 80 is formed upon outer surface 72 adjacent leading edge 73. A peel-off protective strip 85 is removably secured to adhesive strip 80 to protect the adhesive material during storage handling and application of handle grip 60.

In use, handle grip 60 is secured to a conventional racquet handle in virtually the same manner described above in FIG. 1 in a wrapping process in which adhesive strip 80 cooperates with material strip 70 to secure trailing edge 74 and provide the advantages described above. The absence of center bead 25 provides a smoother handle wrap in which raised ribs (seen in FIG. 1) are not present. Nonetheless, the above-described attachment between handle grip layers is maintained with its significant advantage over prior art handle wraps.

FIG. 5 sets forth a perspective view of handle grip 60 wrapped in an alternative or "reversed" manner from that described for handle grip 10 in FIG. 1. Thus, a handle 90 which may be virtually any implement handle receives handle grip 60 with material strip 70 reversed such that surface 72 forms the undersurface while surface 71 forms the outer surface. Correspondingly, edge 74 becomes the leading edge while edge 73 becomes the trailing edge. Adhesive strip 80 overlaps edge 74 on the underlying previous wrap as handle grip 70 is helically wrapped upon handle 90.

What has been shown is an improved self-adhesive wrap on handle grip for sports racquets and/or for other equipment which provides the ease and low cost of prior art handle grips while substantially improving the security and durability of the handle grips. The additional security and durability as well as edge curling avoidance is maintained without the need for undesired adhesive bonding and deposit between the wrap-on handle and the original handle grip of the host racquet. The present invention handle grip may be fabricated using a wide variety of wrapping material to provide virtually any gripping characteristic and perspiration absorption characteristic desired by the user.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in combination with an implement having an elongated handle, a wrap-on grip comprising:
   a resilient elongated material strip of cushioning material defining a first surface, an adhesive-free second surface, a leading edge and a trailing edge; and
   an elongated adhesive strip substantially more narrow than said material strip formed directly upon said first surface adjacent said leading edge,
   said elongated material strip being wrappable upon a handle in a helical wrap to form a grip in which said second surface defines an adhesive-free undersurface against said handle and said first surface defines an outer surface and in which said adhesive strip secures said trailing edge.

2. A wrap-on handle grip as set forth in claim 1 wherein said material strip is formed of a resilient material.

3. A wrap-on handle grip as set forth in claim 2 further including a removably secured peel-off strip overlying said adhesive strip.

4. A wrap-on handle grip as set forth in claim 3 further including an elongated resilient bead secured to said second surface and having a width substantially less than that of said material strip.

5. A wrap-on handle grip as set forth in claim 4 wherein said elongated bead is formed of a resilient material.

6. A wrap-on handle grip as set forth in claim 5 wherein said elongated bead is generally centered upon said second surface.

7. A wrap-on handle grip as set forth in claim 6 wherein said elongated bead defines a substantially greater cross-sectioned width upon said second surface than its thickness extending therefrom.

8. A wrap-on handle grip as set forth in claim 1 further including an elongated resilient bead secured to said second surface and having a width substantially less than that of said material strip.

9. A wrap-on handle grip as set forth in claim 8 wherein said elongated bead is formed of a resilient material.

10. A wrap-on handle grip as set forth in claim 9 wherein said elongated bead is generally centered upon said second surface.

11. A wrap-on handle grip as set forth in claim 10 wherein said elongated bead defines a substantially greater cross-sectioned width upon said second surface than its thickness extending therefrom.

12. A wrap-on handle grip as set forth in claim 4 wherein said elongated resilient bead is generally centered upon said second surface.

13. For use in combination with an implement having an elongated handle, a wrap-on grip comprising:
   an elongated material strip defining an outer surface, an undersurface, a leading edge, and a trailing edge;
   an elongated adhesive strip substantially more narrow than said material strip supported upon said outer surface adjacent said leading edge; and
   an elongated resilient bead secured to said undersurface,
   said handle grip being wrappable upon a handle in a spiral wrap such that said undersurface is wrapped against said handle and said adhesive strip is covered and secures said trailing edge and said elongated bead forms a spiral rib in said material strip.

14. A wrap-on handle grip as set forth in claim 13 wherein said elongated bead is formed of a resilient material.

15. A wrap-on handle grip as set forth in claim 14 wherein said elongated bead is generally centered upon said second surface.

16. A wrap-on handle grip as set forth in claim 15 wherein said elongated bead defines a substantially greater cross-sectioned width upon said second surface than its thickness extending therefrom.

17. A wrap-on handle grip as set forth in claim 13 wherein said elongated resilient bead is generally centered upon said second surface.

18. A wrap-on handle grip as set forth in claim 1 wherein said elongated adhesive strip defines a plurality of adhesive-free gaps therein.

19. A wrap-on handle grip as set forth in claim 1 wherein said elongated material strip defines a first end having an angled edge.

20. For use in combination with an implement having an elongated handle, a wrap-on grip comprising:
   a resilient elongated material strip of cushioning material defining a first surface, an adhesive-free second surface, a leading edge and a trailing edge; and
   an elongated adhesive strip substantially more narrow than said material strip formed directly upon said second surface adjacent said trailing edge,
   said elongated material strip being wrappable upon a handle in a helical wrap to form a grip in which said second surface defines an adhesive-free undersurface against said handle and said first surface defines an outer surface and in which said adhesive strip covers and secures said leading edge of the underlying previous wrap.

21. A wrap-on grip as set forth in claim 20 wherein said material strip is formed of a resilient material.

22. A wrap-on grip as set forth in claim 21 further including a removably secured peel-off strip overlying said adhesive strip.

23. A wrap-on grip as set forth in claim 22 further including an elongated resilient bead secured to said second surface and having a width substantially less than that of said material strip.

* * * * *